United States Patent
Miklós et al.

(10) Patent No.: US 9,544,775 B2
(45) Date of Patent: Jan. 10, 2017

(54) SECURITY MECHANISM FOR MOBILE USERS

(75) Inventors: György Miklós, Pilisborosjenö (HU); Johan Rune, Lindingö (SE); Zoltán Richárd Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 14/115,400

(22) PCT Filed: May 5, 2011

(86) PCT No.: PCT/EP2011/057248
§ 371 (c)(1),
(2), (4) Date: Nov. 4, 2013

(87) PCT Pub. No.: WO2012/149982
PCT Pub. Date: Nov. 8, 2012

(65) Prior Publication Data
US 2014/0080446 A1   Mar. 20, 2014

(51) Int. Cl.
*H04W 12/12* (2009.01)
*H04L 29/06* (2006.01)
*H04W 4/00* (2009.01)

(52) U.S. Cl.
CPC .......... *H04W 12/12* (2013.01); *H04L 63/1466* (2013.01); *H04L 63/1475* (2013.01); *H04W 4/00* (2013.01); *H04W 4/005* (2013.01)

(58) Field of Classification Search
None
See application file for complete search history.

(56) References Cited

U.S. PATENT DOCUMENTS

2002/0197979 A1* 12/2002 Vanderveen ................. 455/410
2007/0297367 A1* 12/2007 Wang ................. H04L 63/0414
                                                                        370/331
(Continued)

FOREIGN PATENT DOCUMENTS

WO   2009055414 A2   4/2009
WO   2009092115      7/2009
(Continued)

OTHER PUBLICATIONS

3GPP TS 23.272 V9.3.0 (Mar. 2010): $3^{rd}$ Generation Partnership Projet; Technical Specification Group Services and System Aspects; Circuit Switched (CS) fallback in Evolved Packet System (EPS); Stage 2 (Release 9).*

(Continued)

*Primary Examiner* — King Poon
*Assistant Examiner* — Vincent Peren
(74) *Attorney, Agent, or Firm* — Murphy, Bilak & Homiller, PLLC

(57) ABSTRACT

A wireless communication device for use in a cellular network. The device comprises a radio interface for enabling communication between the device and a base station of the cellular network over a radio link, and a transfer entity for exchanging user data packets with a core network node of said cellular network over a signalling connection within a Non Access Stratum, via said radio link. The device further comprises a data transmission verification entity for using a verifiable acknowledgement, received from said core network node over a signalling connection within a Non Access Stratum, to confirm delivery of a user data packet sent to the core network node over a signalling connection, the data transmission verification entity being configured to selectively include with a user data packet sent to said core network node across a signalling connection, a request to (Continued)

return to the device a verifiable acknowledgement for the sent user data packet.

15 Claims, 3 Drawing Sheets

(56) References Cited

U.S. PATENT DOCUMENTS

2008/0095362 A1\* 4/2008 Blom et al. ............... 380/45
2009/0305671 A1\* 12/2009 Luft et al. ............... 455/411

FOREIGN PATENT DOCUMENTS

| WO | 2009146355 | 12/2009 |
| WO | 2012095174 A1 | 7/2012 |

OTHER PUBLICATIONS

3GPP TS 23.040 V9.2.0 (Mar. 2010): 3rd Generation Partnership Projet; Technical Specification Group Core Network and Terminals; Technical Realization of Short Message Service (SMS) (Release 9).\*

Unknown, Author. "Network Improvements for Small Data Transmissions." Huawei. TD S2-100693. 3GPP TSG SA WG2 Meeting #77. Jan. 18-22, 2010. Shenzhen, China.

\* cited by examiner

SECURITY MECHANISM FOR MOBILE USERS

TECHNICAL FIELD

The present invention relates to security mechanisms for mobile users of a cellular network. In particular, though not necessarily, the invention relates to apparatus and methods for detecting the presence of fake base station in a communication link.

BACKGROUND

Current cellular communication networks offer a high degree of security to users. Security ensures both authentication of users to the network and vice versa, and protection against eavesdropping. Security may also provide integrity protection allowing a recipient of data (possibly within the network) to confirm the integrity of sent data. This may involve a sender adding an integrity checksum to a message and which is computed using a secret key. The receiver, knowing the secret key, can verify the integrity checksum and thereby ensure that the message has indeed been sent by the trusted sender and has not been tampered with while in transit.

The known security mechanisms have been developed to work efficiently with conventional cellular network use cases. These tend to be concerned with users possessing mobile devices such as mobile telephones, smart phones, and other wireless enabled devices, and who make use of voice and data services. Such services involve the transfer of significant amounts of data to and from the user devices. Volumes of signalling traffic associated with these scenarios are not great when compared to the transferred data volumes. As such, the signalling overheads associated with security mechanism such as client and network authentication are relatively small.

In the coming years it is expected that there will be a rapid growth in so-called machine-to-machine (M2M) applications that use cellular network infrastructure. Such applications involve devices such as sensors and actuators communicating with other devices or network servers, often without direct human operation. An example application might involve domestic electricity meters configured to periodically transmit electricity consumption readings to a server owned by the utility company supplying electricity. M2M application are expected to massively increase the number of wirelessly connected devices in use with cellular networks. Ericsson™ has predicted 50 billion such devices by the year 2020.

A feature that distinguishes M2M applications from conventional cellular network services is the relatively small amounts of data traffic associated with the former. An electricity meter reading application might, for example, require only the sending of a few bytes of data each month. Nonetheless, given the huge number of devices that are expected to be in use, the total volume of traffic that will be added to networks will be very great. The existing signalling mechanisms including those associated with security are not necessarily well suited to M2M applications, and only add to the load on the network.

Due to the relatively small volumes of data associated with individual M2M transactions, it may be desirable to send data from a device to the core network via a signalling connection within a Non Access Stratum (NAS). This approach can avoid the need to establish a separate bearer specifically for data traffic. Moreover, whilst a device is authenticated to the core network, there is no authentication between the mobile node and the base stations within the RAN, as would be the case were data to be sent using a data bearer (requiring as it would the pre-establishement of security associations between the mobile node and the base station). This might however open the possibility of "fake" base stations attracting devices, resulting, for example, in a denial-of-service to devices. It will be appreciated that integrity protecting messages sent from the client devices will not by itself be sufficient to prevent a denial-of-service attack.

This problem may be mitigated by requiring a recipient node within the core network, for example a Serving GPRS Support Node (SGSN) of a 3G network or a Mobility Management entity (MME) of an LTE network, to return acknowledgements for each packet received from a mobile node. It is important that the acknowledgements are verifiable, in the sense that they allow a mobile node to verify that an acknowledgement has been issued by the intended recipient node. As has already been noted however, given the relatively small volumes of data likely to be associated with M2M applications, it is desirable to minimise the signalling overheads to avoid overloading cellular networks.

3GPP TS 23.272 describes a mechanism for delivering Short Message Service (SMS) messages over NAS signalling. Each SMS message is acknowledged by the core network with an integrity protected acknowledgement. However, this again leads to a relatively high volume of signalling and is unsuitable for widely used M2M services.

SUMMARY

It is an object of the invention to provide a lightweight security mechanism which provides a degree of security for client devices sending data across a cellular network. This is applicable in particular to M2M devices and applications, although it is also applicable to other devices and services.

According to a first aspect of the present invention there is provided a wireless communication device for use in a cellular network. The device comprises a radio interface for enabling communication between the device and a base station of the cellular network over a radio link, and a transfer entity for exchanging user data packets with a core network node of said cellular network over a signalling connection within a Non Access Stratum, via said radio link. The device further comprises a data transmission verification entity for using a verifiable acknowledgement, received from said core network node over a signalling connection within a Non Access Stratum, to confirm delivery of a user data packet sent to the core network node over a signalling connection, the data transmission verification entity being configured to selectively include with a user data packet sent to said core network node across a signalling connection, a request to return to the device a verifiable acknowledgement for the sent user data packet.

Embodiments of the invention provide an extremely lightweight mechanism for exchanging data between a wireless communication device and a core network. The data may be relayed onward to a destination such as an external application server. In particular, there is no need to establish a security association between a wireless communication device and a base station of a radio access network. This approach is particularly useful for machine-to-machine applications.

According to a second aspect of the present invention there is provided apparatus configured for use within a core network of a cellular communication network. The apparatus comprises a transfer entity for exchanging user data packets with user terminals over a signalling connection within a Non Access Stratum, via a radio link, and a data transmission verification entity for selectively sending verifiable acknowledgements, in respect of user data packets received from user terminals, to those user terminals across said signalling connection. The data transmission verification entity is configured to send a verifiable acknowledgement to a user terminal in response to receipt from that user terminal of a user data packet containing a request for a verifiable acknowledgement.

According to a third aspect of the present invention there is provided a method of sending data from a wireless communication device to a core network node within a cellular network. The method comprises exchanging user data packets between the wireless communication device and the core network node over a signalling connection within a Non Access Stratum, via said radio link, and including within a user data packet sent to said core network node across the signalling connection, a request to return to the device a verifiable acknowledgement for the sent user data packet. At said wireless communication device, a verifiable acknowledgement, received from said core network node over said signalling connection, is used to confirm delivery of a data packet sent to the core network node over said signalling connection.

According to a fourth aspect of the present invention there is provided an apparatus configured for use within a core network of a cellular communication network. The apparatus comprises a transfer entity for exchanging user data packets with user terminals over a signalling connection within a Non Access Stratum, via a radio link. The apparatus further comprises a data transmission verification entity for selectively sending verifiable acknowledgements, in respect of user data packets received from user terminals, to those user terminals across said signalling connection, the data transmission verification entity being configured to send a verifiable acknowledgement to a user terminal in response to an internally or core network generated trigger indicating a mobility event for that user terminal.

DETAILED DESCRIPTION

The problem of ensuring delivery of data sent from a client device to a core network node of a cellular network using a Network Access Stratum (NAS) signalling connection has been discussed above, as has the related danger of the introduction of a fake base station into a communication path between a client device and a core network node. This problem/danger can be mitigated by requiring the core network node to acknowledge receipt of every packet sent to it by the client device. However, a more optimal solution can be arrived at by recognising that, once receipt of one or a small number of packets has been successfully acknowledged by the core network node to the client device, the client device can reasonably assume that the communication path between itself and the core network node is reliable. In particular, it can assume that a base station in the path is operating correctly and most likely has been authenticated by the core network (node). It is unlikely that a fake base station would be able to establish a "connection" with the core network node such as would result in successful delivery of the original packet and the associated acknowledgement. As such, it may be appropriate for the core network node to acknowledge packets only periodically, or following certain predefined events.

Figure 1:
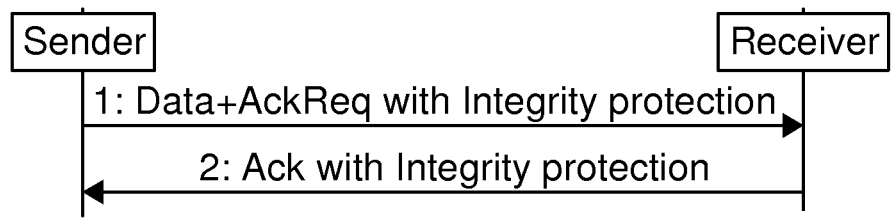
FIG. 1 illustrates a request-based approach to ensuring data delivery over a cellular network.

A communication sender "A" (client device) can indicate explicitly when it requires an integrity protected acknowledgement from the receiver "B" (core network node). The indication is sent from A to B together with the integrity protected data. When such an acknowledgement request is indicated, the receiver B sends an acknowledgement back to the sender A. The acknowledgement is integrity protected between A and B. When the sender A does not get an acknowledgement from B despite the explicit acknowledgement request, it may retransmit the data. After a predefined number of retransmissions has been reached without successful acknowledgement, the sender may conclude that it is no longer connected to the receiver. Such an event may be logged and reported when applicable. FIG. 1 illustrates the basic concept of this approach, where "AckReq" indicates the sender's request for an explicit integrity protected acknowledgement. Integrity protection of the acknowledgement may be achieved using a secret shared between A and B. (Note that the solution does not exclude the possibility of other non-cryptographic retransmission schemes working between the sender and the receiver.)

Figure 2:
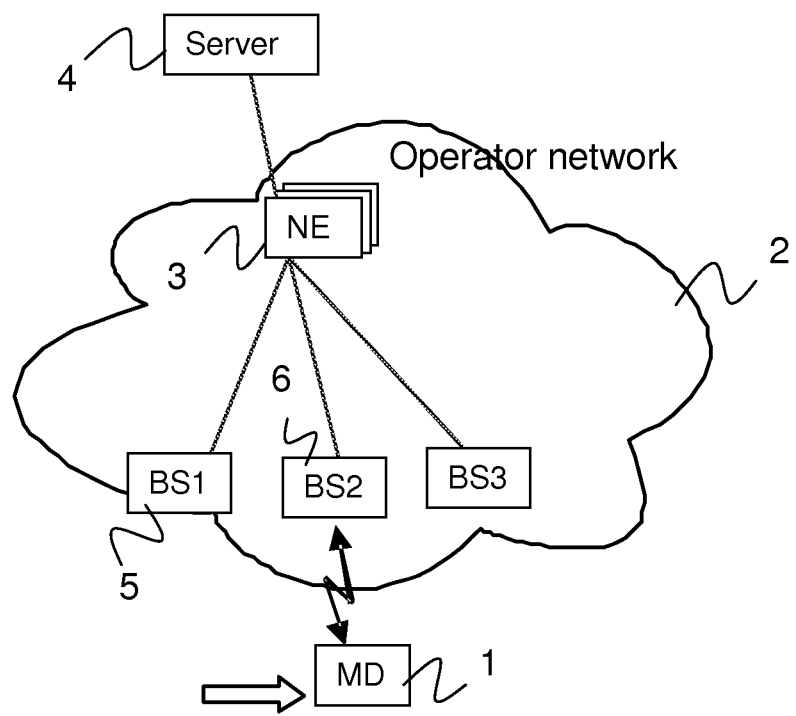
FIG. 2 illustrates schematically a cellular network architecture used for M2M applications.

As a specific example, consider the M2M application scenario depicted in FIG. 2. Here, a terminal termed "MD" (i.e. a Machine Device, such as a sensor, actuator, etc.) and identified by reference numeral 1 comprises a radio interface allowing it to communicate with a radio access network of a cellular network 2 such as a 3G or LTE network. Within the cellular network 2, a core network element or node (NE) 3 handles the Non Access Stratum (NAS) for the terminal 1. [3GPP TS 21.905 defines the NAS as protocols between the UE and the core network that are not terminated in the UTRAN. However, the definition is not limiting, as the term is applicable to network architectures having different radio access network technologies, e.g. the E-UTRAN of LTE.] In particular, the NE 3 is responsible for mobility management, and the terminal 1 has a security association with the network entity NE. In a 3G network, the NE 3 may be a Serving GPRS Support Node (SGSN), whilst in a LTE network the NE 3 may be a Mobility Management Entity (MME). An application server 4 hosts the M2M service and communicates with the NE 3, for example, by way of an IP backbone of the cellular network operator and/or via the Internet.

In the scenario considered here, small volumes of data are sent between the terminal 1 and the application server 4 within packets sent over a signalling channel, i.e. within the NAS. [This data transfer is analogous for example to the existing NAS Tracking Area Update (TAU) signalling sent between the UE and the NE, although of course the TAU signalling does not carry data per se.] Data received by the NE can be forwarded, as necessary, to an external server, e.g. the application server 4. Initially, the terminal 1 is attached to a first base station BS1 5. [In the case of a 3G network, the base station is a Node B, whilst in the case of a LTE network the base station is an evolved Node B.] Packet losses due to bit errors or congestion are handled by retransmission mechanisms between the terminal 1 and the current Base Station BS1, and between the Base Station and the NE. Additionally, a retransmission mechanism may be in use between the NE 3 and the application server 4. The retransmission mechanisms are used to recover from packet losses, but do not protect against an attack with a fake base station dropping packets, since such a base station could acknowledge reception towards the terminal exactly as a real base station would. Thus, in some embodiments, an identity of a destination entity to which the NE should forward the user data packets is included in the sent data packets.

According to standard behaviour, as the terminal 1 moves (e.g. because it is located on a moving vehicle) it may be handed off to another base station, in this example BS2 6. In this case, the terminal 1 should ensure that BS2 is indeed a real base station, i.e., it is connected to the mobile operator's network. Such an assurance can be obtained by the terminal 1 requesting from the NE 3 an integrity protected acknowledgement from the NE 3 when the terminal 1 detects that it has moved to a new Base Station. Such an acknowledgement cannot be produced by a fake base station as the necessary security key would not be available to it (i.e. it is only available to the network element NE 3). While the terminal stays attached to the same base station BS2, it does not require integrity protected acknowledgement for all uplink packets, since it would be difficult for a further, fake base station to replace BS2 in the communication path during the current exchange.

According to a non-limiting example, the terminal 1 may request an acknowledgement from the NE 3 by including within a message header an "AckReq" field as a one-bit flag. Each message header contains a sequence number (Seq) which is incremented by the sender for each message sent. The message header may further include a Data field which is a flag indicating whether there is any data in the message. The integrity protected acknowledgement may then include a sequence number in the header (AckSeq). The AckSeq is used by the receiver to indicate the highest number Seq of a valid message. The whole acknowledgement message including the headers would be integrity protected using a shared secret between the sender of the receiver. To further illustrate this approach, consider a terminal A sending to a network entity B a message with Data=Yes, Seq=1, AckReq=Yes and the actual data. B receives this message and sends an acknowledgement with Data=no, AckSeq=1. This scheme could be implemented symmetrically in both uplink and downlink, or alternatively it is possible to implement the AckReq mechanism only in the uplink.

As well as requiring integrity protected acknowledgements immediately following a hand off between base stations, the terminal may make periodic, but infrequent requests for acknowledgements. Another scenarios involves requiring an integrity protected acknowledgement after a certain number of messages. Use of such infrequent integrity acknowledgements can protect against theoretically possible although in practice unlikely attacks, such as when an attacker destroys a real base station whilst it is in operation and immediately installs a new, fake base station. These approaches represent a trade-off between security against attackers and communications overhead.

The terminal may be able to control when to request an integrity protected acknowledgement, or the requirement may be preset. Alternatively, the network may instruct the terminal when integrity protected acknowledgements should be requested. In some cases, the requirement may be switched off such that integrity protected acknowledgement are never requested, or may be set such that an integrity protected acknowledgement is requested for every sent packet.

As an alternative to having the terminal request an integrity protected acknowledgement, the network may decide on its own when such an acknowledgement is to be sent. This can include the case when the terminal has been handed over to a new base station as, of course, the network has knowledge of such an event. The network may use other parameters such as subscription or device capabilities to determine the conditions for sending an integrity protected acknowledgement. For example, the network may determine that, for a terminal with an "M2M" subscription and a device capability indicating "battery constraints", an integrity protected acknowledgement should be sent only after handover and once per day. For another M2M device with capability indicating "no battery constraints", the network may determine that an integrity protected acknowledgement should be sent for all packets. Allowing the network to decide the conditions for the sending of integrity protected acknowledgements relieves the terminal of this task. However this would mean that the terminal can no longer influence the frequency with which integrity acknowledgements are sent, despite the fact that it is the terminal which ultimately requires the acknowledgements.

Figure 3:
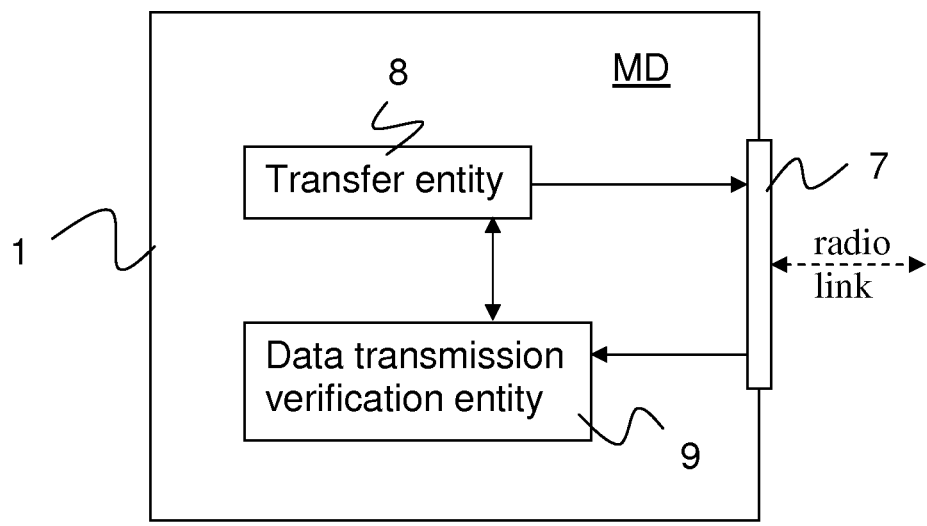
FIG. 3 illustrates schematically a mobile device configured for secure data delivery to a core network.

FIG. 3 illustrates schematically a M2M terminal 1. This comprises a standard radio interface and controller 7 for sending and receiving data over the radio interface of a cellular (3G or LTE) network 2. Additionally, the terminal comprises a transfer entity 8 for sending small volumes of data to a core network node via a signalling channel in the NAS. This entity 8 is configured to selectively include, with sent packets, a request for an integrity protected acknowledgement. The terminal comprises a data transmission verification entity 9 configured to receive (requested) acknowledgements, and to verify these acknowledgements, e.g. using a shared secret.

Figure 4:
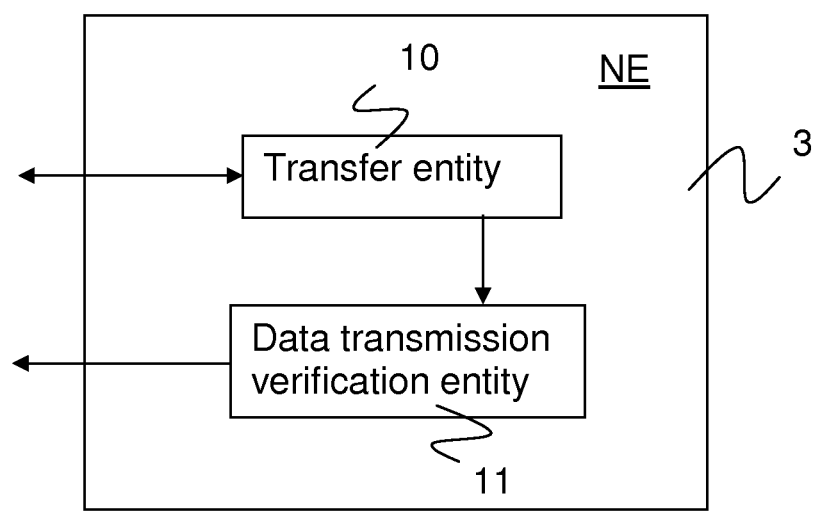
FIG. 4 illustrates schematically a network element configured for secure data delivery to a core network.

FIG. 4 illustrates schematically a Network Entity (NE) 3 which may be, for example, an SGSN or an MME. The NE operates within the NAS of the cellular network core network, and typically handles mobility for user terminals. The NE comprises a transfer entity 10 configured to receive (and possibly send) small volumes of data from a mobile device via a signalling connection in the NAS. The NE further comprises a data transmission verification entity 11 configured, upon receipt of an instruction from the transfer entity, to send to the MD a verifiable integrity protected acknowledgement. This acknowledgement may be generated using a secret shared with the MD (e.g. and obtained by the NE from the Home Subscriber Server). As is discussed elsewhere in this document, the transmission verification entity 11 may alternatively, or additionally, send an acknowledgement in response to an internal or core network generated trigger indicative of a mobility event involving a user.

Figure 5:
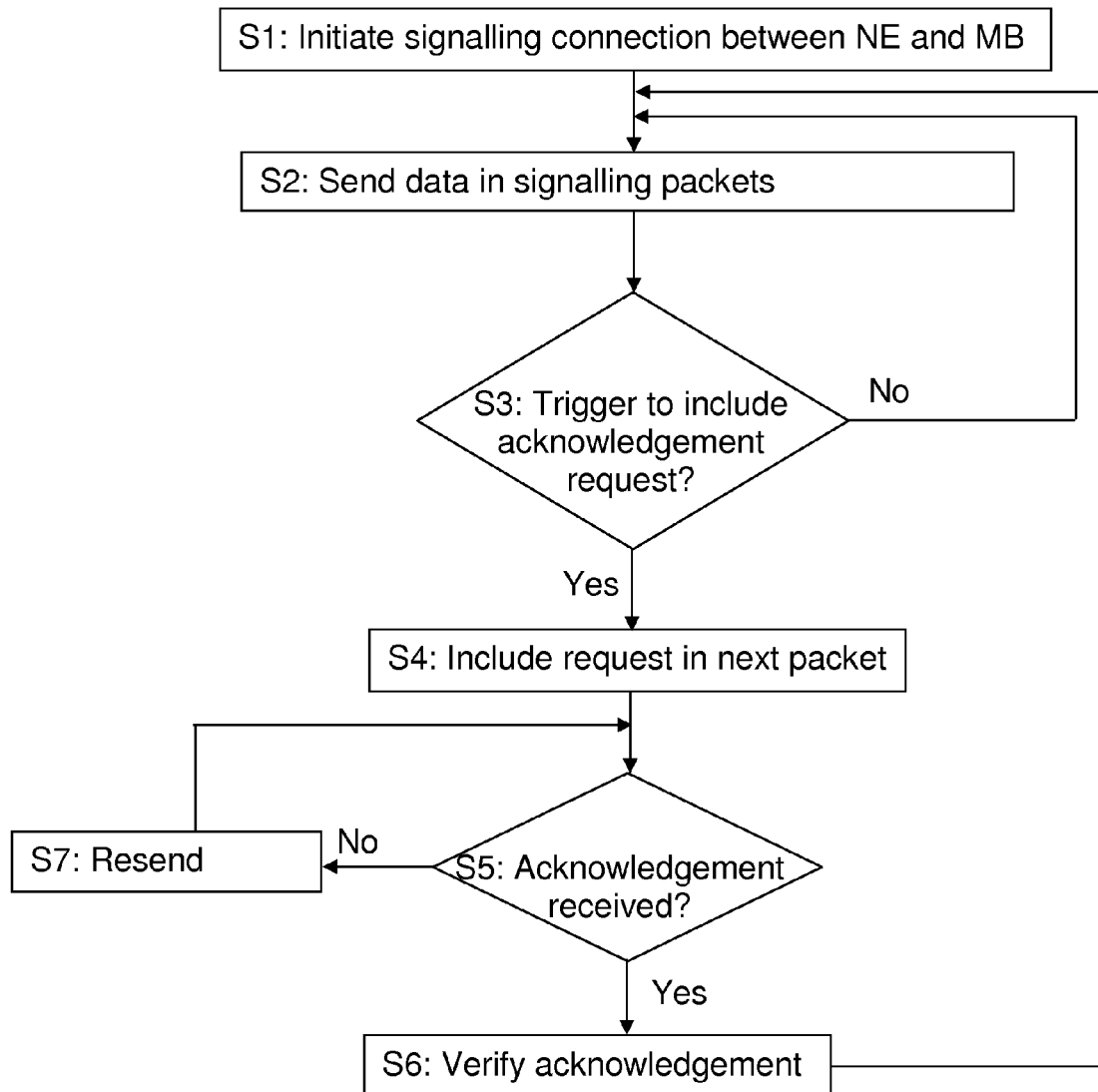
FIG. 5 is a flow diagram illustrating a method for providing secure data delivery to a core network.

FIG. 5 is a flow diagram illustrating schematically a method carried out at a mobile device (MD) for the purpose of securing traffic sent to a NE. At step S1, a signalling connection (within the NAS) is established between the MD and the NE. At step S2, the signalling connection can be used to transport data between the MD and the NE, for forwarding by the NE to an external application server. At step S3, a trigger is generated by an event such as a BS handover, or expiry of a timer. At step S4, the trigger causes a request for an acknowledgement to be included in the next packet sent by the MD. At step S5, the MD checks for receipt of an acknowledgement. If such an acknowledgement is received, at step S6 the acknowledgement is verified, e.g.

using a shared secret, and the process returned to step S2. [Of course, in practice, further packets may be sent while the acknowledgement is awaited and verified.] If no acknowledgement is received, the packet with acknowledgement request may be resent at step S7. Again, the sending of other packets may continue in parallel.

It will be appreciated by the person of skill in the art that various modifications may be made to the above described embodiments without departing from the scope of the present invention.

The invention claimed is:

1. A wireless communication device for use in a cellular network, the device comprising:
   a radio interface configured to enable communication between the device and a base station of the cellular network over a radio link;
   a transfer entity configured to exchange user data packets with a core network node of said cellular network over a signaling connection within a Non Access Stratum, via said radio link: and
   a data transmission verification entity configured to use a verifiable acknowledgement, received from said core network node over the signaling connection, to confirm delivery of a user data packet sent to the core network node over the signaling connection, the data transmission verification entity being further configured to selectively include, with the user data packet sent to said core network node across the signaling connection, a request to return to the device the verifiable acknowledgement for the sent user data packet;
   wherein the verifiable acknowledgement allows the wireless communication device to verify that the verifiable acknowledgement has actually been sent by said core network node with which the device intends to communicate.

2. The wireless communication device of claim 1, wherein said wireless communication device is configured for use with a 3G cellular communication network and said transfer entity is configured to exchange said user data packets with a Serving GPRS Support Node (SGSN) across the Non Access Stratum.

3. The wireless communication device of claim 1, wherein said wireless communication device is configured for use with a Long Term Evolution communication network and wherein said transfer entity is configured to exchange said user data packets with a Mobility Management Entity (MME) across the Non Access Stratum.

4. The wireless communication device of claim 1, wherein said data transmission verification entity is configured to verify an acknowledgement using a secret shared between the wireless communication device and the core network node.

5. The wireless communication device of claim 1, wherein said transfer entity is configured to include with sent user data packets an identity of a destination entity to which the core network node should forward the user data packets.

6. The wireless communication device of claim 1, wherein said data transmission verification entity is configured to include said request within only a fraction of sent user data packets.

7. The wireless communication device of claim 6 and further comprising a handover controller configured to inform said data transmission verification entity that a handover to a new base station has been performed, and wherein said data transmission verification entity is further configured to send, at handover, said request together with at least one outgoing user data packet.

8. The wireless communication device of claim 6, wherein said data transmission verification entity is configured to periodically include said request within sent user data packets.

9. An apparatus configured for use within a core network of a cellular communication network, the apparatus comprising:
   a transfer entity configured to exchange user data packets with user terminals over a signaling connection within a Non Access Stratum, via a radio link; and
   a data transmission verification entity configured to selectively send verifiable acknowledgements, in respect of user data packets received from user terminals, to those user terminals across said signaling connection, the data transmission verification entity being configured to send a verifiable acknowledgement to a user terminal in response to receipt from that user terminal of a user data packet containing a request for the verifiable acknowledgement;
   wherein the verifiable acknowledgement allows the user terminal to verify that the verifiable acknowledgement has actually been sent by the apparatus within the core network.

10. The apparatus of claim 9, wherein the apparatus is configured to provide mobility management for user terminals.

11. The apparatus of claim 10, wherein the apparatus is configured to operate as one of a Serving GPRS Support Node (SGSN) of a 3G network, and a Mobility Management Entity (MME) of a Long Term Evolution (LTE) network.

12. The apparatus of claim 9, wherein said data transmission verification entity is configured to send the verifiable acknowledgement in response to an internally generated trigger, or a trigger generated at another node within the cellular network.

13. A method of sending data from a wireless communication device to a core network node within a cellular network, the method comprising:
   exchanging user data packets between the wireless communication device and the core network node over a signaling connection within a Non Access Stratum, via a radio link;
   including, within a user data packet sent to said core network node across the signaling connection, a request to return to the wireless communication device a verifiable acknowledgement for the sent user data packet; and
   at said wireless communication device, using the verifiable acknowledgement, received from said core network node over said signaling connection, to confirm delivery of the user data packet sent to the core network node over said signaling connection;
   wherein the verifiable acknowledgement allows said wireless communication device to verify that the verifiable acknowledgement has actually been sent by the core network node with which the wireless communication device intends to communicate.

14. The method of claim 13, further comprising including said request within only a fraction of sent user data packets.

15. An apparatus configured for use within a core network of a cellular communication network, the apparatus comprising:

a transfer entity configured to exchange user data packets with user terminals over a signaling connection within a Non Access Stratum, via a radio link; and a data transmission verification entity configured to selectively send verifiable acknowledgements, in respect of user data packets received from user terminals, to those user terminals across said signaling connection, the data transmission verification entity being configured to send a verifiable acknowledgement to a user terminal in response to an internally or core generated trigger indicating a mobility event for that user terminal;

wherein the verifiable acknowledgement allows the user terminal to verify that the verifiable acknowledgement has actually been sent by the apparatus within the core network with which the user terminal intends to communicate.

* * * * *